United States Patent
Fatemi et al.

(10) Patent No.: US 12,473,959 B2
(45) Date of Patent: Nov. 18, 2025

(54) PASSIVE ELECTROMAGNETIC DAMPER WITH ASYMMETRICAL FORCES

(71) Applicant: GM Global Technology Operations LLC, Detroit, MI (US)

(72) Inventors: Alireza Fatemi, Canton, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 752 days.

(21) Appl. No.: 17/863,518

(22) Filed: Jul. 13, 2022

(65) Prior Publication Data
US 2024/0019013 A1    Jan. 18, 2024

(51) Int. Cl.
*F16F 15/03* (2006.01)
*B60G 17/06* (2006.01)

(52) U.S. Cl.
CPC ............ *F16F 15/03* (2013.01); *B60G 17/06* (2013.01); *B60G 2500/10* (2013.01)

(58) Field of Classification Search
None
See application file for complete search history.

(56) References Cited

U.S. PATENT DOCUMENTS

| | | | |
|---|---|---|---|
| 8,448,952 B2 * | 5/2013 | Serbu | B60G 17/0195 188/267 |
| 2011/0298399 A1 * | 12/2011 | Ogawa | F16F 15/03 318/14 |
| 2020/0023704 A1 * | 1/2020 | Toyohira | B60G 17/0165 |
| 2020/0062068 A1 * | 2/2020 | Trangbaek | B60G 17/06 |
| 2022/0266646 A1 * | 8/2022 | Yamamoto | B60G 15/04 |

FOREIGN PATENT DOCUMENTS

| | | | |
|---|---|---|---|
| DE | 102010035423 A1 | 3/2012 | |
| DE | 102015101864 A1 | 8/2015 | |
| DE | 102015013231 B4 * | 6/2019 | ............ B60G 13/14 |

OTHER PUBLICATIONS

DE-102015013231-B4: English Machine Translation (Year: 2019).*
DE Office Action for Application No. 10 2023 100 366.6 dated Oct. 20, 2023, 5 pages.

* cited by examiner

Primary Examiner — Melanie Torres Williams
(74) Attorney, Agent, or Firm — CANTOR COLBURN LLP (57) ABSTRACT

A vehicle, suspension system of the vehicle and method of operating the suspension system is disclosed. The suspension system includes a rotary motor, a rectifier circuit and a logic circuit. The rotary motor is configured to generate a current based on a direction of rotation of the rotary motor. The rectifier circuit is configured to applying a damping force against the rotation at the rotary motor based on an impedance. The logic circuit changes the impedance of the rectifier circuit based on the direction of rotation of the rotary motor.

20 Claims, 6 Drawing Sheets

FIG. 7

PASSIVE ELECTROMAGNETIC DAMPER WITH ASYMMETRICAL FORCES

INTRODUCTION

The subject disclosure relates to a suspension system for a vehicle and, in particular, to a suspension system and method for providing asymmetrical forces at the suspension system.

A suspension system for a vehicle can employ a damper for absorbing forces applied to the suspension system. The suspension system converts a linear force to a rotation between a rotor and a stator at the damper. A compressive force generates a rotation in a first direction (i.e., counter-clockwise) at the damper. A rebound force generates a rotation in a second direction (i.e., clockwise). The damper includes a rotor that rotates with respect to a stator. The rotor includes permanent magnets disposed thereon and the stator includes coils or conductive disk for the flow of current therethrough. During rotation, the magnets of the rotor induce current to flow in the stator. Applying a resistance or impedance to the current can generate a mechanical resistance to the rotary motion. Such resistance is generally applied equally, regardless of the whether the rotor is rotating clockwise or counterclockwise. However, suspension systems require that the rebound force be greater than a compressive force. Accordingly, it is desirable to provide a damper that can provide a resistance to the force that is asymmetrical (i.e., that is different depending on the direction of the rotation at the damper).

SUMMARY

In one exemplary embodiment, a method of operating a suspension system of a vehicle is disclosed. A current flows through a rectifier circuit of the suspension system in response to a rotation at a rotary motor of the suspension system. A damping force is applied against the rotation of the rotary motor based on an impedance of the rectifier circuit. The impedance of the rectifier circuit is changed based on a direction of the rotation of the rotary motor.

In addition to one or more of the features described herein, the method further includes generating the rotation at the rotary motor in response to a linear motion of a shaft coupled to a wheel of the vehicle and resisting the linear motion of the shaft with a first damping force against the linear motion in a first direction and a second damping force against the linear motion in a second direction. The method further includes changing the impedance of the rectifier circuit in response to an encoded magnetic signal that indicates the direction of the rotation of the rotary motor. The method further includes placing a first impedance in the rectifier circuit and removing a second impedance from the rectifier circuit when the rotary motor is rotating in a first direction and placing the second impedance in the rectifier circuit and removing the first impedance from the rectifier circuit when the rotary motor is rotating in a second direction. The method further includes coupling a circuit switch to a first control signal when the rotary motor is rotating in a first direction and coupling the circuit switch to a second control signal when the rotary motor is rotating in a second direction. The first control signal and the second control signal are one of a "close switch" signal and a pulse generator signal, respectively, and a first pulse generator signal having a first duty cycle and a second pulse generator signal having a second duty cycle, respectively. The rectifier circuit includes an active diode circuit coupled to the rotary motor, the active diode circuit including a transistor, further comprising applying the damping force via the active diode circuit during a failure of the transistor.

In another exemplary embodiment, a suspension system of a vehicle is disclosed. The suspension system includes a rotary motor, a rectifier circuit and a logic circuit. The rotary motor is configured to generate a current based on a direction of rotation of the rotary motor. The rectifier circuit is configured to applying a damping force against the rotation at the rotary motor based on an impedance. The logic circuit changes the impedance of the rectifier circuit based on the direction of rotation of the rotary motor.

In addition to one or more of the features described herein, the suspension system further includes a shaft coupled to the rotary motor, the shaft configured to move in a linear motion to generate the rotation at the rotary motor, wherein the rectifier circuit resists the linear motion in a first direction with a first damping force and resists the linear motion in a second direction with a second damping force. The suspension system further includes a magnetic encoder at the rotary motor for supplying a magnetically encoded signal to the logic circuit indicative of the direction of rotation of the rotary motor. The rectifier circuit includes first circuit switch and a second circuit switch and the logic circuit is configured to close the first circuit switch and open the second circuit switch when the rotary motor is rotating in a first direction and to open the first circuit switch and close the second circuit switch when the rotary motor is rotating in a second direction. The rectifier circuit includes a circuit switch and the logic circuit is configured to couple a first control signal to the circuit switch when the rotary motor is rotating in a first direction and to couple a second control signal to the circuit switch when the rotary motor is rotating in a second direction. The first control signal and the second control signal are one of a "close switch" signal and a pulse generator signal, respectively and a first pulse generator signal having a first duty cycle and a second pulse generator signal having a second duty cycle, respectively. The rectifier circuit includes an active diode circuit coupled to the rotary motor, the active diode circuit including a transistor, wherein the active diode circuit applies the damping force during a failure of the transistor.

In yet another exemplary embodiment, a vehicle is disclosed. The vehicle includes a suspension system. The suspension system includes a rotary motor, a rectifier circuit and a logic circuit. The rotary motor is configured to generate a current based a direction of rotation of the rotary motor. The rectifier circuit is configured to applying a damping force against the rotation at the rotary motor based on an impedance. The logic circuit changes the impedance of the rectifier circuit based on the direction of rotation of the rotary motor.

In addition to one or more of the features described herein, the vehicle further includes a shaft coupled to the rotary motor, the shaft configured to move in a linear motion to generate the rotation at the rotary motor, wherein the rectifier circuit resists the linear motion in a first direction with a first damping force and resists the linear motion in a second direction with a second damping force. The rotary motor further includes a magnetic encoder for supplying a magnetically encoded signal to the logic circuit indicative of the direction of rotation of the rotary motor. The rectifier circuit includes first circuit switch and a second circuit switch and the logic circuit is configured to close the first circuit switch and open the second circuit switch when the rotary motor is rotating in a first direction and to open the first circuit switch and close the second circuit switch when the rotary motor is rotating in a second direction. The rectifier circuit includes a circuit switch and the logic circuit is configured to couple a first control signal to the circuit switch when the rotary motor is rotating in a first direction and to couple a second control signal to the circuit switch when the rotary motor is rotating in a second direction. The first control signal and the second control signal are one of a "close switch" signal and a pulse generator signal, respectively, and a first pulse generator signal having a first duty cycle and a second pulse generator signal having a second duty cycle, respectively.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
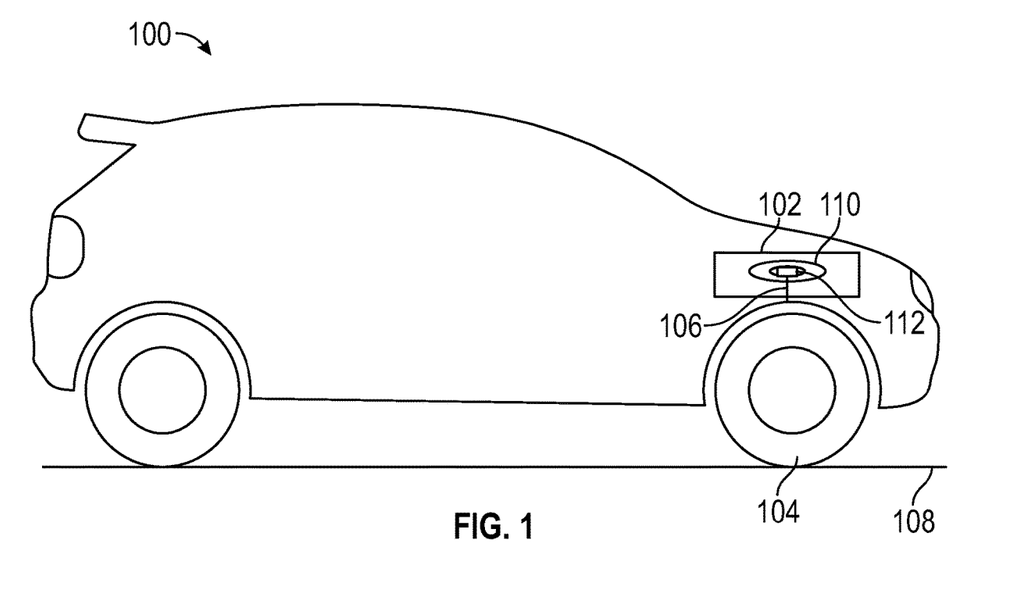
FIG. 1 shows a vehicle in an illustrative embodiment.

In accordance with an exemplary embodiment, FIG. 1 shows a vehicle 100. The vehicle 100 includes a suspension system 102 coupled to a wheel 104 of the vehicle, via a rod or shaft 106. The shaft 106 moves up with respect to the suspension system 102 when a compressive force is applied to the wheel 104, such as by a bump in the road 108. The suspension system 102 absorbs the compressive force and provides a rebound force to push the shaft down to maintain a suitable contact between the wheel 104 and the road 108. The suspension system 102 includes a damper 110 and a cam 112 that converts the linear motion of the shaft 106 into a rotation at the damper.

Figure 2:
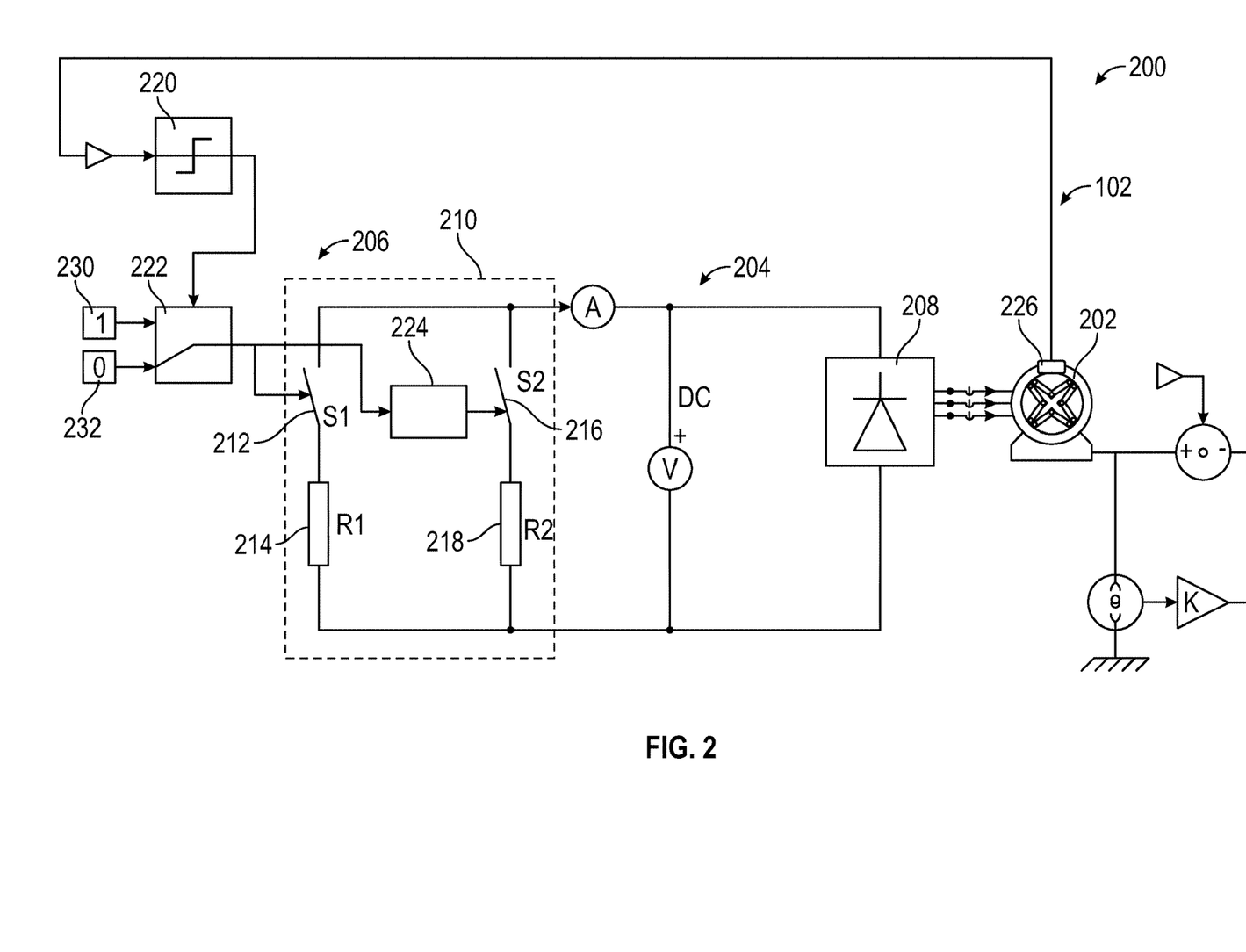
FIG. 2 shows a schematic diagram of the suspension system, in a first embodiment.

FIG. 2 shows a schematic diagram 200 of the suspension system 102, in a first embodiment. The suspension system 102 includes a rotary motor 202 having a stator and a rotor, a rectifier circuit 204 connected to the stator of the rotary motor, and a logic circuit 206 for controlling a configuration of the rectifier circuit.

The rotary motor 202 includes a stator and a rotor. The rotor includes permanent magnets and the stator includes electrically conductive wires which form a multiple phase winding. The rotor rotates relative to the stator as a result of movement of the shaft 106. As a result of the relative rotation, a current flows through the stator and the rectifier circuit 204. The current from the rotary motor 202 can be in a sinusoidal waveform, a trapezoidal waveform or other suitable waveform. The current can be a single-phase current, three-phase current, etc. The impedance of the rectifier circuit 204 resists current flow and consequently provides a resistive force or damping force against the direction of rotation of the rotor. As disclosed herein, the magnitude of the damping force is dependent upon a direction of rotation of the rotor. Thus, a first damping force is applied at the rotary motor during a first direction of rotation of the rotor, resulting in a first mechanical resistance against the linear motion of the shaft 106 in a first linear direction. Also, a second damping force is applied at the rotary motor during a second direction of rotation of the rotor, resulting in a second mechanical resistance against the linear motion of the shaft 106 in a second linear direction.

The rectifier circuit 204 includes a diode rectifier 208 and an adjustable impedance section 210. The diode rectifier 208 is connected to the stator of the rotary motor 202. The adjustable impedance section 210 includes a first branch and a second branch, both in parallel to each other and to the diode rectifier 208. The first branch includes a first circuit switch 212 capable of closing to introduce a first impedance 214 into the first branch of the rectifier circuit 204 and opening to remove the first impedance from the first branch. The second branch includes a second circuit switch 216 capable of closing to introduce a second impedance 218 into the second branch of the rectifier circuit 204 and opening to remove the second impedance from second branch.

The logic circuit 206 includes a direction indicator 220, a control switch 222 and a NOT gate 224. The direction indicator 220 is coupled to a magnetic encoder 226 at the rotary motor 202. The magnetic encoder 226 supplies a magnetically encoded signal indicative of a direction of rotation of the rotor (and thus a direction of linear motion of the shaft 106).

The direction indicator 220 outputs a direction-dependent signal, such as a positive signal for a first rotational direction of the rotor and a negative signal for a second rotational direction of the rotor. Alternatively, the direction-dependent signal can be a binary signal, such as a '1' value corresponding to the first rotational direction and a '0' value corresponding to the second rotational direction. The direction-dependent signal is received at the control switch 222 and is used to flip the control switch between a first state and a second state. In the first state, the control switch 222 connects a first control signal 230 (e.g., '1') to the first circuit switch 212. In the second state, the control switch 222 connects a second control signal 232 (e.g., '0') to the first circuit switch 212. The NOT gate 224 is connected between the control switch 222 and the second circuit switch 216, thereby ensuring that the first circuit switch 212 and the second impedance switch receive opposite commands. As an illustrative example, when the control switch 222 couples to the first control signal 230, the first circuit switch 212 is closed and the second circuit switch 216 is opened. Also, when the control switch 222 couples to the second control signal 232, the first circuit switch 212 is opened and the second circuit switch 216 is closed.

The impedance of the rectifier circuit 204 controls the extent of a resistive force the rectifier circuit provides against a rotation of the rotor of the rotary motor 202. The first impedance 214 and the second impedance 218 have different impedance values. Thus, the rectifier circuit 204 provides a first resistive force or first damping force against the rotor when the rotor is rotating in a first direction and a second resistive force or second damping force against the rotor when the rotor is rotating in a second direction.

Figure 3:
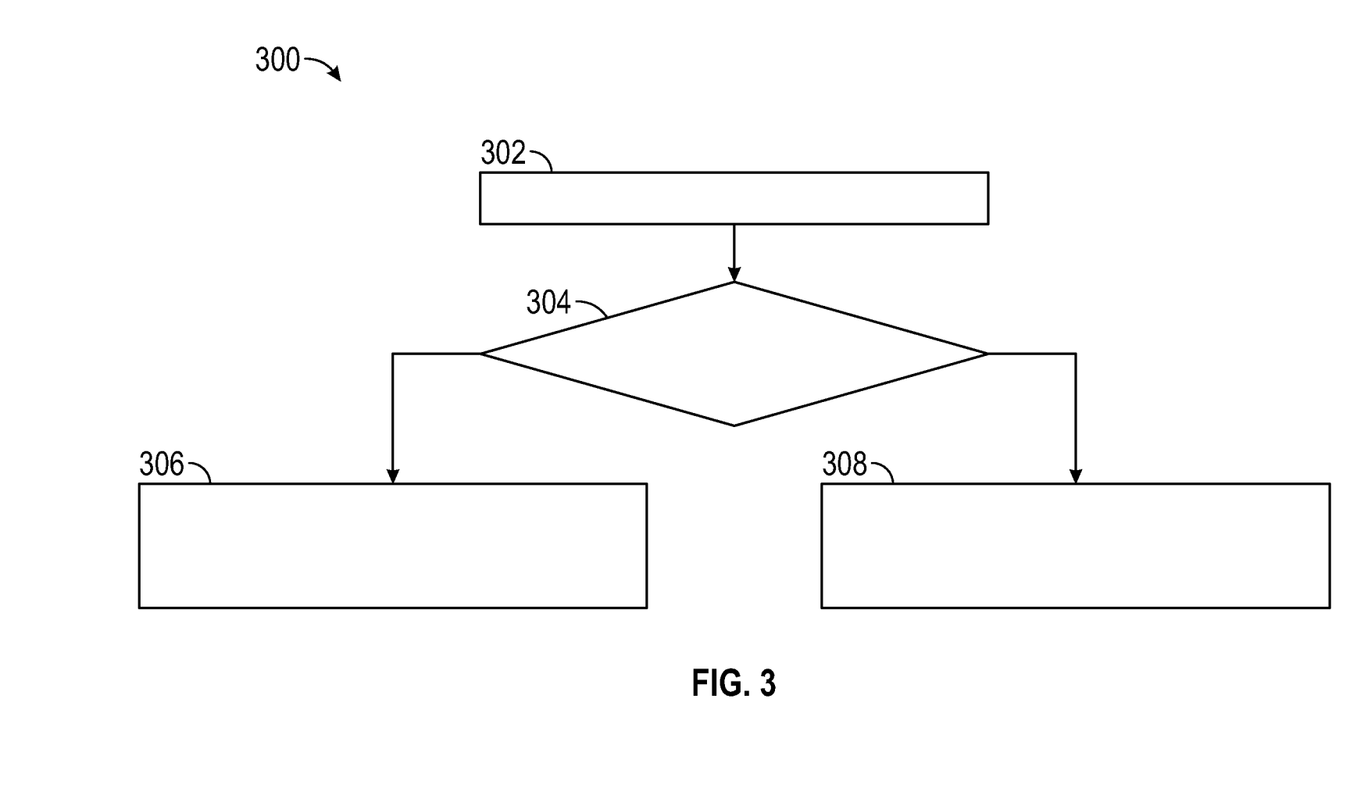
FIG. 3 shows a flowchart illustrating operation of the suspension system of FIG. 2.

FIG. 3 shows a flowchart 300 illustrating operation of the suspension system 102 of FIG. 2. In box 302, an encoded magnetic signal is received at the direction indicator 220 to indicate a direction of rotation of the rotor. In box 304, the magnetic signal is decoded in order to determine whether the rotor is rotating in a first direction or a second direction. If the rotor is rotating in a first direction, the method proceeds to box 306. In box 306, the control switch 222 provides a control signal to close the first circuit switch 212, placing the first impedance 214 in the circuit, and to open the second circuit switch 216, removing the second impedance 218 from the circuit. Returning to box 304, if the rotor is rotating in a second direction, the method proceeds to box 308. In box 308, the control switch provides a control signal to open the first circuit switch 212 to remove the first impedance 214 from the circuit and to close the second circuit switch 216 to include the second impedance 218 in the circuit.

Figure 4:
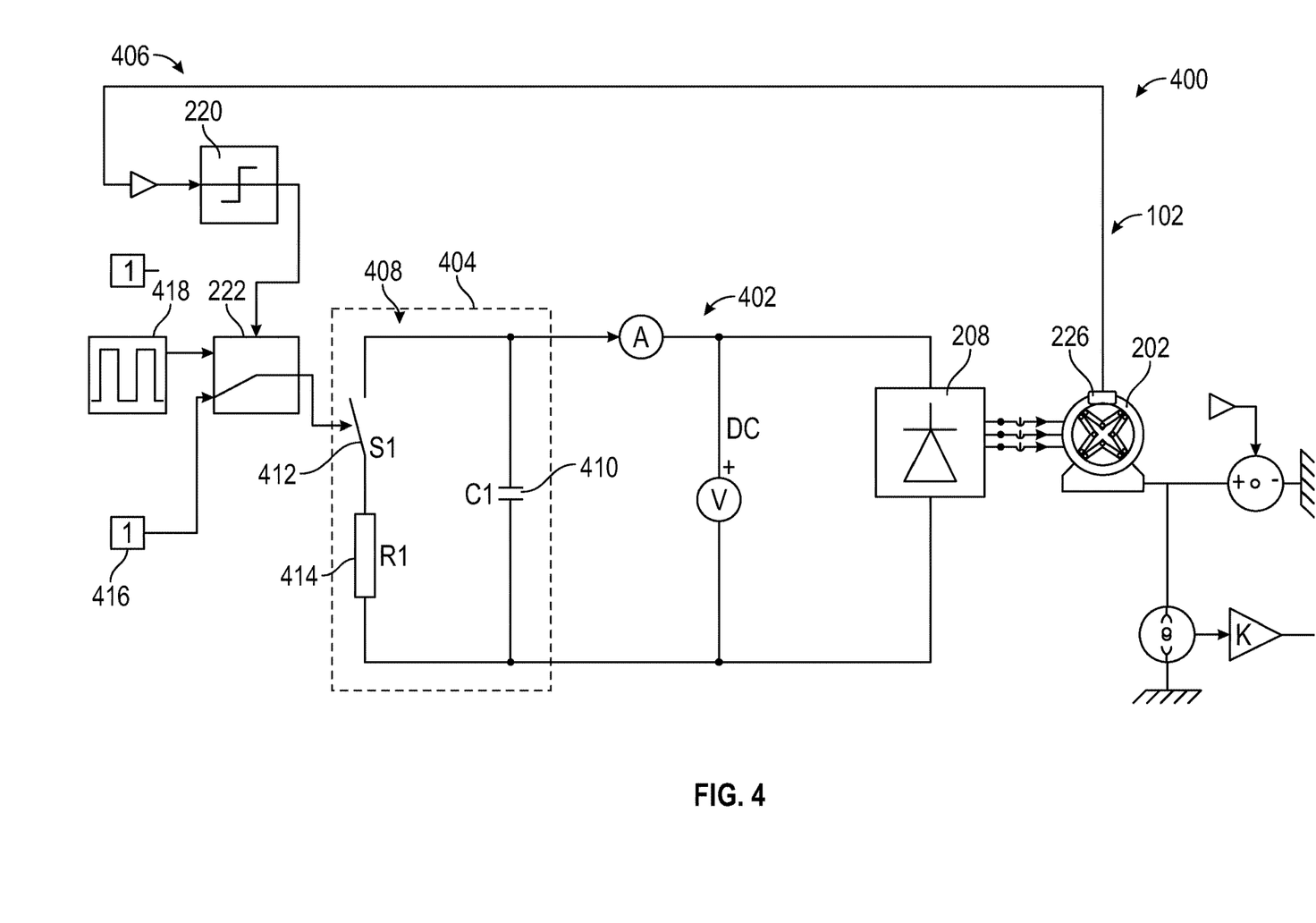
FIG. 4 shows a schematic diagram of the suspension system in a second embodiment.

FIG. 4 shows a schematic diagram 400 of the suspension system 102 in a second embodiment. The suspension system 102 includes the rotary motor 202, an alternate rectifier circuit 402 coupled to a rotor of the rotary motor, and an alternate logic circuit 406 for controlling a configuration of the alternate rectifier circuit.

The alternate rectifier circuit 402 includes a diode rectifier 208 and an impedance section 404. The diode rectifier 208 is connected to the stator of the rotary motor 202. The impedance section 404 includes an impedance branch 408 in parallel with a capacitor 410. The impedance branch 408 includes a circuit switch 412 and an impedance 414. The circuit switch 412 is a signal switch of the alternate rectifier circuit 402 and is capable of closing to introduce the impedance 414 into the circuit and opening to remove the impedance from the circuit.

The alternate logic circuit 406 includes the direction indicator 220, the control switch 222 a first control signal 416 and a second control signal 418. When the direction-dependent signal from the direction indicator 220 indicates rotation in a first direction, the control switch 222 connects the first control signal to the circuit switch 412. As illustrated in FIG. 4, the first control signal 416 is a "close switch" signal (1') which closes the circuit switch 412, thereby introducing the impedance 414 into the circuit.

When the direction-dependent signal from the direction indicator 220 indicates rotation in a second direction, the control switch 222 connects the second control signal to the circuit switch 412. As illustrated in FIG. 4, the second control signal 418 is a pulse generator signal which can be used to alternatively open and close the circuit switch 412 according to duty cycle. The pulse generator signal is adjustable to a suitable control cycle that controls a magnitude of a resistive or damping force at the rotary motor 202.

In an alternate embodiment, both the first control signal can be a first pulse generator signal having a first duty cycle and the second control signal can be a second pulse generator signal having a second duty cycle. In this embodiment, a first damping force is provided at the rotary motor during rotation in a first direction and a second damping force is provided at the rotary motor during rotation in a second direction. In yet another embodiment, the first control signal and the second control signal are binary signals.

Figure 5:
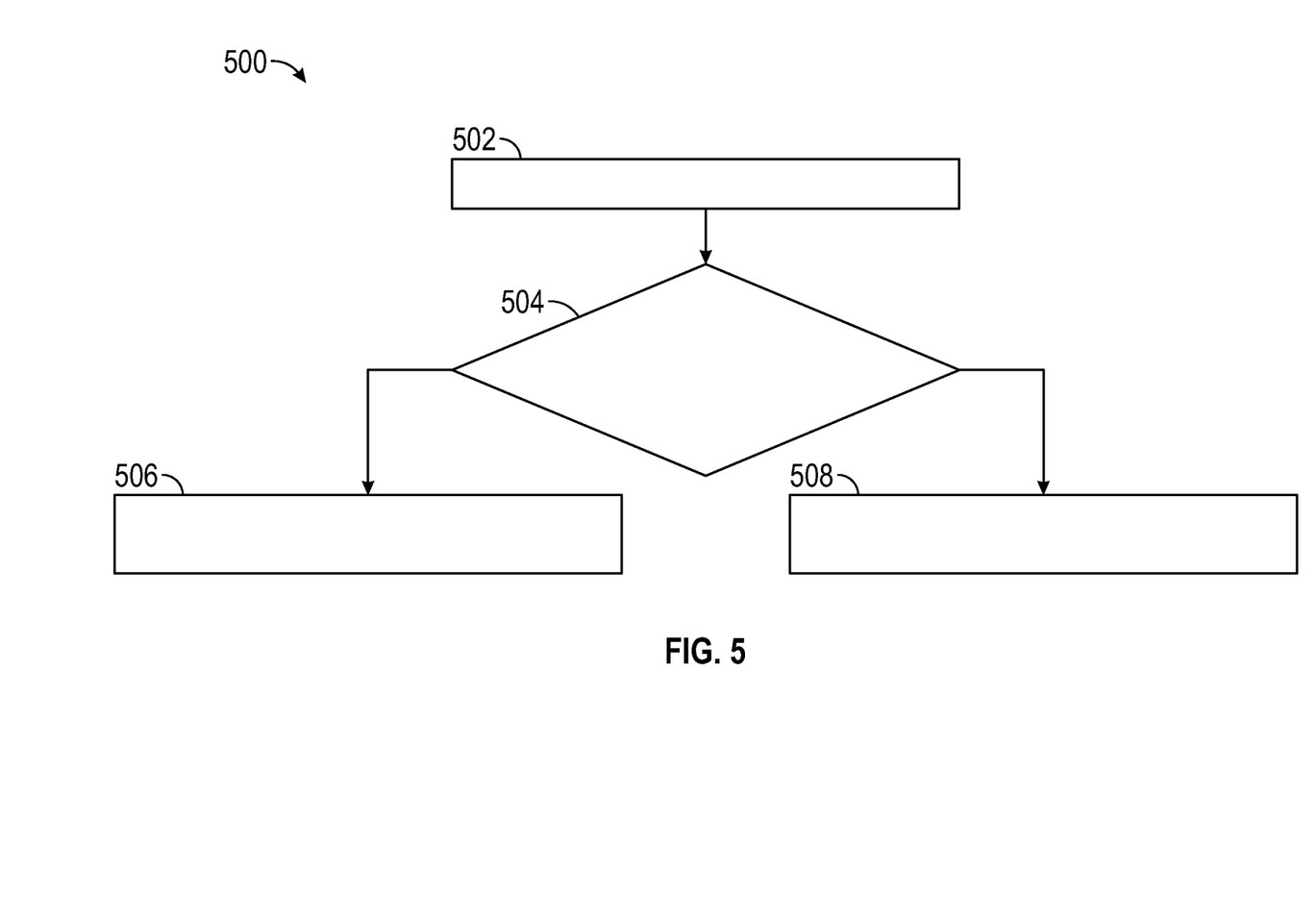
FIG. 5 shows a flowchart illustrating operation of the suspension system of FIG. 4.

FIG. 5 shows a flowchart 500 illustrating operation of the suspension system 102 of FIG. 4. In box 502, an encoded magnetic signal is received that indicates a direction of rotation of the rotor. In box 504, the magnetic signal is decoded in order to determine whether the rotor is rotating in a first direction or a second direction. If the rotor is rotating in a first direction, the method proceeds to box 506.

In box 506, the control switch couples the first control signal to the circuit switch 412. Returning to box 504, if the rotor is rotating in a second direction, the method proceeds to box 508. In box 508, the control switch couples the second control signal to the circuit switch 412.

Figure 6:
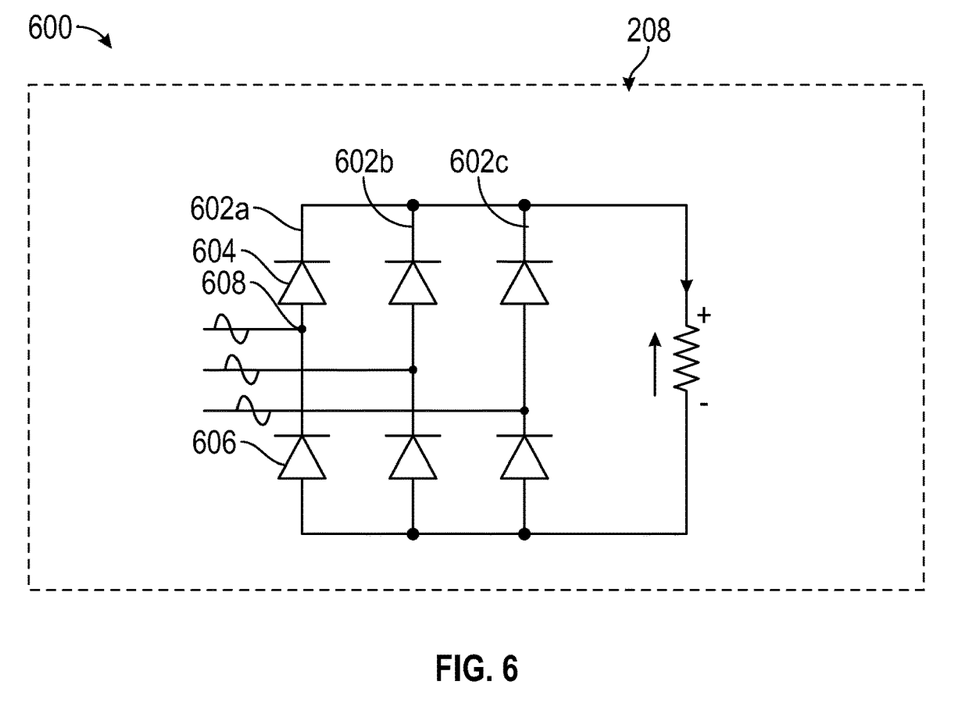
FIG. 6 shows a passive diode circuit that implements the diode rectifier.

FIG. 6 shows a passive diode circuit 600 that implements the diode rectifier 208. The passive diode circuit 600 includes three diode branches 602a-602c in parallel. Each diode branch includes two diodes (e.g., diodes 604, 606) in series. Each diode branch receives one phase of a three-phase voltage of the rotary motor 202. The phase is received at a node (e.g., node 608) between the two diodes of the diode branch.

Figure 7:
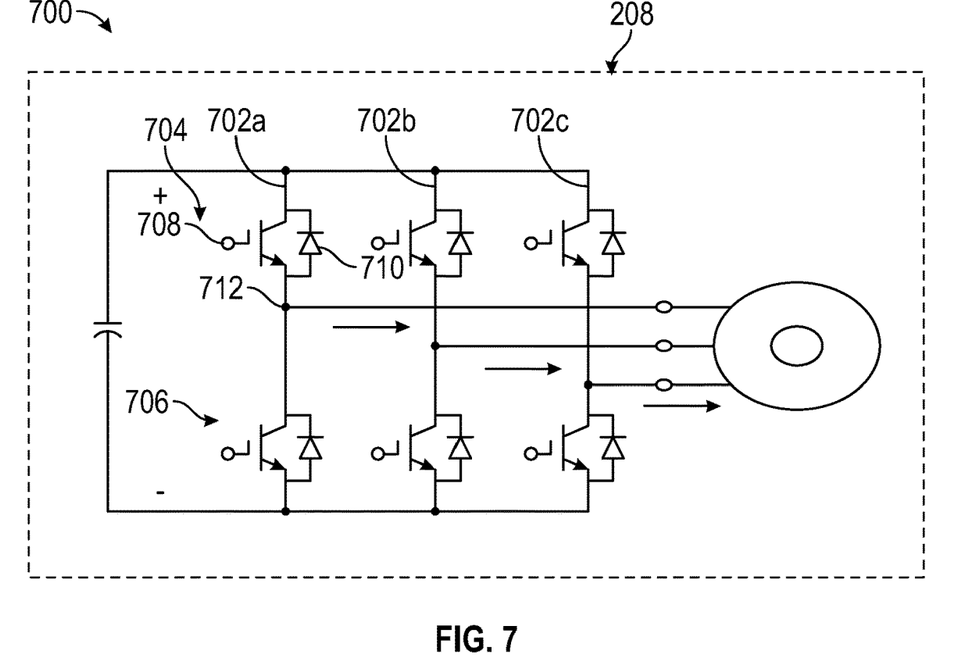
FIG. 7 shows an active diode circuit that implements the diode rectifier.

FIG. 7 shows an active diode circuit 700 that implements the diode rectifier 208. The active diode circuit 700 includes three diode branches 702a-702c in parallel. Each diode branch includes two diode switches (i.e., diode switches 704, 706) in series. A diode switch (e.g., diode switch 704) includes a transistor 708 spanned by a diode 710. Each diode branch receives one phase of a three-phase voltage of the rotary motor 202. The phase is received at a node (e.g., node 712) between the two diode switches of the diode branch. In the event that a switch fails (i.e., the transistor fails), the associated diode can still be used. In the event that all switches fail, the active diode circuit 700 takes on the form of the passive diode circuit 600. Thus, the diode rectifier 208 is still operable in the event of a failure occurring in the active diode circuit 700. The active diode circuit 700 can thus still be used to applying a damping force at the rotary motor 202 in a fail-safe mode (i.e., in the event of a failure at the switches).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating a suspension system of a vehicle, comprising:
flowing a current through a rectifier circuit of the suspension system in response to a rotation at a rotary motor of the suspension system, the rectifier circuit including only a single impedance element connected across a rectifier;
controlling an impedance supplied to the rectifier by the impedance element by controlling a configuration of a switch associated with the single impedance element based on a first signal indicative of a first direction of rotation of the rotary motor and a second signal indicative of a second direction of rotation of the rotary motor, wherein at least one of the first signal and the second signal is a pulse width modulation signal; and
applying a damping force from the rectifier circuit against the rotation of the rotary motor based on the impedance of the rectifier circuit.

2. The method of claim 1, further comprising generating the rotation at the rotary motor in response to a linear motion of a shaft coupled to a wheel of the vehicle and resisting the linear motion of the shaft with a first damping force against the linear motion in a first direction and a second damping force against the linear motion in a second direction.

3. The method of claim 1, further comprising changing the impedance of the rectifier circuit in response to an encoded magnetic signal that indicates the direction of the rotation of the rotary motor.

4. The method of claim 1, further comprising placing a first impedance in the rectifier circuit and removing a second impedance from the rectifier circuit when the rotary motor is rotating in a first direction and placing the second impedance in the rectifier circuit and removing the first impedance from the rectifier circuit when the rotary motor is rotating in a second direction.

5. The method of claim 1, further comprising coupling a circuit switch to a first control signal when the rotary motor is rotating in a first direction and coupling the circuit switch to a second control signal when the rotary motor is rotating in a second direction.

6. The method of claim 5, wherein the first control signal and the second control signal are one of: (i) a "close switch" signal and a pulse generator signal, respectively; and (ii) a first pulse generator signal having a first duty cycle and a second pulse generator signal having a second duty cycle, respectively.

7. The method of claim 1, wherein the rectifier circuit includes an active diode circuit coupled to the rotary motor, the active diode circuit including a transistor, further comprising applying the damping force via the active diode circuit during a failure of the transistor.

8. A suspension system of a vehicle, comprising:
a rotary motor configured to generate a current based on a direction of rotation of the rotary motor;
a rectifier circuit including only a single impedance element connected across a rectifier, the rectifier circuit configured to applying a damping force against the rotation at the rotary motor based on an impedance of the single impedance element; and
a logic circuit that controls an impedance supplied to the rectifier by the impedance element by controlling a configuration of a switch associated with the single impedance element based on a first signal indicative of a first direction of rotation of the rotary motor and a second signal indicative of a second direction of rotation of the rotary motor, wherein at least one of the first signal and the second signal is a pulse width modulation signal.

9. The suspension system of claim 8, further comprising a shaft coupled to the rotary motor, the shaft configured to move in a linear motion to generate the rotation at the rotary motor, wherein the rectifier circuit resists the linear motion in a first direction with a first damping force and resists the linear motion in a second direction with a second damping force.

10. The suspension system of claim 8, further comprising a magnetic encoder at the rotary motor for supplying a magnetically encoded signal to the logic circuit indicative of the direction of rotation of the rotary motor.

11. The suspension system of claim 8, wherein the rectifier circuit includes first circuit switch and a second circuit switch and the logic circuit is configured to close the first circuit switch and open the second circuit switch when the rotary motor is rotating in a first direction and to open the first circuit switch and close the second circuit switch when the rotary motor is rotating in a second direction.

12. The suspension system of claim 8, wherein the rectifier circuit includes a circuit switch and the logic circuit is configured to couple a first control signal to the circuit switch when the rotary motor is rotating in a first direction and to couple a second control signal to the circuit switch when the rotary motor is rotating in a second direction.

13. The suspension system of claim 12, wherein the first control signal and the second control signal are one of: (i) a "close switch" signal and a pulse generator signal, respectively; and (ii) a first pulse generator signal having a first duty cycle and a second pulse generator signal having a second duty cycle, respectively.

14. The suspension system of claim 8, wherein the rectifier circuit includes an active diode circuit coupled to the rotary motor, the active diode circuit including a transistor, wherein the active diode circuit applies the damping force during a failure of the transistor.

15. A vehicle, comprising:
a suspension system, including:
a rotary motor configured to generate a current based a direction of rotation of the rotary motor;
a rectifier circuit including only a single impedance element connected across a rectifier, the rectifier circuit configured to applying a damping force against the rotation at the rotary motor based on an impedance; and
a logic circuit that controls an impedance supplied to the rectifier by the impedance element by controlling a configuration of a switch associated with the single impedance element based on a first signal indicative of a first direction of rotation of the rotary motor and a second signal indicative of a second direction of rotation of the rotary motor, wherein at least one of the first signal and the second signal is a pulse width modulation signal.

16. The vehicle of claim 15, further comprising a shaft coupled to the rotary motor, the shaft configured to move in a linear motion to generate the rotation at the rotary motor, wherein the rectifier circuit resists the linear motion in a first direction with a first damping force and resists the linear motion in a second direction with a second damping force.

17. The vehicle of claim 15, wherein the rotary motor further comprises a magnetic encoder for supplying a magnetically encoded signal to the logic circuit indicative of the direction of rotation of the rotary motor.

18. The vehicle of claim 15, wherein the rectifier circuit includes first circuit switch and a second circuit switch and the logic circuit is configured to close the first circuit switch and open the second circuit switch when the rotary motor is rotating in a first direction and to open the first circuit switch and close the second circuit switch when the rotary motor is rotating in a second direction.

19. The vehicle of claim 15, wherein the rectifier circuit includes a circuit switch and the logic circuit is configured to couple a first control signal to the circuit switch when the rotary motor is rotating in a first direction and to couple a second control signal to the circuit switch when the rotary motor is rotating in a second direction.

20. The vehicle of claim 19, wherein the first control signal and the second control signal are one of: (i) a "close switch" signal and a pulse generator signal, respectively; and (ii) a first pulse generator signal having a first duty cycle and a second pulse generator signal having a second duty cycle, respectively.

* * * * *